UNITED STATES PATENT OFFICE 2,551,467

PREPARATION OF GRANULAR POLYVINYL ETHERS

Calvin E. Schildknecht, Easton, Pa., assignor to General Aniline & Film Corporation, New York, N. Y., a corporation of Delaware No Drawing. Application May 18, 1945, Serial No. 594,591

10 Claims. (Cl. 260—91.1)

The present invention relates to the preparation of tacky, rubber like synthetic organic polymeric materials and is particularly concerned with a method of preparing organic highly polymeric materials so that they are obtained in the form of relatively small size particles or granules which have little or no tendency to adhere permanently to one another or to coalesce to a solid mass but which may still retain a high amount of tack.

As is well known, many synthetic organic polymers are tacky, rubber like materials and are difficult to handle and store. They are frequently obtained in the form of sticky masses or large lumps which readily adhere to one another and which cannot be broken up without considerable difficulty. As a result, it has been impractical to store the solid polymer since, in its sticky state, it could not be readily handled and could not be further processed. Consequently, such materials have largely been handled and stored in the form of solutions in suitable solvents. This has not been entirely satisfactory, since for many purposes the solvent must be removed and, even where the presence of solvents is permissible, requires expensive storage vessels and the use, for a long period of time, of a large amount of solvents, any of which are relatively expensive. The use of solutions has also materially increased the transportation cost and handling cost for the polymer.

In accordance with the present invention, such solid tacky, rubber like synthetic organic polymers now may be readily obtained as solids free of solvents and in a form in which they may be readily handled either in the form of small discrete particles, which have little or no tendency to stick to one another or to other solids, or in the form of an open porous granular mass. In this form, the polymers may be stored for long periods of time without any adverse effect and still retain their individual shape. The particles or granular mass of polymer obtained in accordance with the present invention may readily be transported and may readily be further processed and readily dissolved in suitable solvents. For the sake of simplifying the present description, these polymers will be referred to in the present description as "granular polymers."

The present invention is particularly adapted for the production of granular synthetic organic polymers, such as the high polymers of alkyl vinyl ethers, as n-butyl vinyl ether, isopropyl vinyl ether, and others; and other vinyl polymers, such as, vinyl acetate or other vinyl esters; acrylic acid polymers; synthetic rubber-like polymers, such as, polymerizates of butadiene; and interpolymers of the above-mentioned types of compounds with each other or with other polymerizable organic compounds.

Briefly stated, the process of the present invention comprises polymerizing at a low temperature, vinyl compounds in solution in an inert non-polar solvent and in the presence of an acid type polymerization catalyst; and while the thus obtained polymers are still suspended in, or wet by, the non-polar solvent employed for polymerization and at a temperature below that at which it becomes tacky, treating the wet polymer with a polar solvent which swells but does not dissolve the polymer and which is soluble in, or miscible with, the non-polar solvent employed by polymerization, and thereafter removing the non-polar solvent employed for polymerization prior to separation of the polymer from the polar solvent employed. The normally sticky or tacky polymer is thus obtained in the form of small particles having little or no tendency to adhere to one another or to other solids, or in the form of an open porous granular mass which may readily be broken up into particles of small size, as contrasted with the gummy masses heretofore obtained.

In practicing the present invention, the alkyl vinyl ethers are dissolved in a non-polar solvent, for instance, a low molecular weight hydrocarbon, such as propane, which is inert during the polymerizaton. The solution is chilled to a relatively low temperature and an acid type polymerization catalyst is then added. The specific details of the process employed for polymerization do not, per se, form a part of the present invention and any suitable solvent polymerization process in which a non-polar solvent is used may be employed, for instance, that disclosed in United States Patents No. 2,104,000 and No. 2,061,934. In general, the lower the temperature employed for polymerization, the higher is the molecular weight of the polymer which is obtained. At the low temperatures employed for polymerization, the polymers obtained are relatively insoluble in the polymerization solvents and, therefore, largely separate in the form of particles having a relatively small size. At the low temperatures employed for polymerization, the polymer is non-tacky and there is little or no tendency for the particles to agglomerate or adhere to one another. However, in accordance with the prior art processes for separating the polymer from the solvent employed for polymerization, the polymer was obtained as large coalesced masses when separated from the solvent and raised to room temperature. Complete removal of the solvent was also quite difficult and the polymer containing minor amounts of solvent was more sticky than the pure polymers.

As stated above, the polymeric material which is obtained from the polymerization process is mixed, while it is still at a low temperature, such that it is not tacky, and while still dispersed in or at least wet by the non-polar solvent employed for the polymerization, with or wet by a polar solvent which will swell but not dissolve the polymer.

In accordance with one method of practicing my invention, I add to the slurry of high polymer and solvent, remaining after polymerization, a substantial amount of a polar solvent, which will swell but not dissolve the polymer. This second solvent, in addition to swelling but not dissolving the polymer, should also be a material which will not freeze to a solid mass at the polymerization temperature or at a slightly higher temperature, e. g., a temperature at which the polymer becomes tacky. It should also be soluble in or partially miscible with the diluent used in polymerization and preferably should have a higher boiling point than the diluent used for polymerization, although for ready removal from the polymer, too high a boiling material is preferably avoided.

Numerous polar organic liquids are suitable for use in practicing the invention and include the low aliphatic alcohols, methyl, ethyl, propyl, butyl, etc., ketones, such as acetone, methyl ethyl ketone, and the like, and various ethers, such as, monomethyl ether of ethylene glycol (methyl Cellosolve), monobutyl ether of ethylene glycol (butyl Cellosolve) and the like. Methanol is particularly useful for this purpose. Advantageously, a mixture of polar liquids may be employed in practicing the present invention in order to control the drying of the polymer and for other purposes. It is also frequently advantageous to employ as the polar solvent for use in the present invention, a mixture of a liquid which, by itself, has slightly greater solvency for the vinyl ether polymers than is desired, along with a non-solvent for the polymers, the relative proportions of the solvent and non-solvent for the polymers being so proportioned that the liquid swells but does not dissolve the polymer. Thus, in case acetone is employed as the polar solvent in the present invention, it may advantageously contain a minor amount, up to ten percent, of water. This slightly decreases the solvent action of the acetone on the polymer and results in the production of a more granular product. While some of the water may freeze at the extremely low polymerization temperatures, the ice thus formed is present as fine crystals and is not objectionable. At such low temperatures where ice is formed, the acetone does not dissolve the polymer and as the temperature is raised in drying the polymer, the presence of the water in the acetone prevents any undesirable solvent action on the polymer.

This polar solvent is preferably added at a relatively low temperature and the mixture may then be separated by filtration if desired, or the non-polar solvent employed for the polymerization may be removed by evaporation provided it is lower boiling than the polar solvent, leaving the polymer particles dispersed in the second solvent. In this condition, they are non-sticky and do not adhere to each other or to other solids. Any excess polar solvent then may be readily removed by filtration, either at a relatively low temperature or room temperature. The high polymer, wet with the polar solvent, filters easily without clogging the filter. The granular polymer, thus obtained, can be dried at a temperature below its softening point, for instance, 30–50° C. with or without vacuum. There is thus obtained dry non-adhering granules of the polymer. If desired, a minor amount (about 1%) of the polar solvent may be left in the polymer to reduce the tendency to adhere, but this is usually unnecessary. The particle size of the polymer which is obtained is much more adaptable to technical use than the irregular masses and chunks heretofore obtained.

While the polar solvent may be added to the polymerization product before any removal of the solvent employed for polymerization and while the polymer is still suspended in a relatively large amount of the solvent employed for the polymerization, the polymer, if desired, may be separated from the major part of the non-polar solvent employed for polymerization by any suitable means, so long as it is maintained at a low temperature at which it is non-tacky and the amount of non-polar polymerization solvent removed is not so great but that the polymer is still wet therewith. Such partial removal may advantageously be effected by filtration or, if a normally gaseous non-polar solvent such as propane was used during polymerization, a portion of it may be permitted to vaporize at a low temperature, i. e., below that at which the polymer becomes tacky or soluble in the non-polar solvent, under a vacuum if necessary. The thus obtained particles of polymer, while still at a low temperature and wet with polymerization solvent, are then wet by a suitable polar solvent of the type heretofore described. This may be accomplished by submerging the particles in a bath of polar solvent or by spraying or otherwise treating them so that they are uniformly wet by the polar solvent. Any great excess of the polar solvent may then be removed from the particles by filtration and the polymer particles which are still wet with non-polar solvents and possibly still containing traces of the polar solvent are then dried. This drying may advantageously be carried out at room or a slightly higher temperature in order to remove all of the non-polar solvent and then all or the greater part of the polar solvent. At no time during the drying of the polymer should the temperature be so high that it tends to flow and lose its granular form. By this method of procedure, the polymer is obtained in the form of small granules, having a small particle size, and little or no tendency to adhere to one another or to other solids.

In accordance with a preferred form of practicing the invention, I incorporate in the polar solvent, before it is added to the wet polymer, a quenching agent for the catalysts employed for the polymerization. This quenching agent conveniently may be ammonia or some other basic reacting compound. If a stabilizer is to be incorporated in the polymer, it may advantageously be added to the polar solvent before addition to the wet polymer. In case the particular stabilizer employed is a basic compound, a portion of it may serve to quench the polymerization catalyst. Since the polymerization catalyst residues (salts of the compounds used as catalysts) are soluble in most of the polar solvents used in practicing the present invention, these residues are removed from the polymers in solution in the polar solvent when the excess polar solvent is removed from the polymer by filtration or some equivalent means. I have found that such catalyst residues are much more readily removed from the polymer when the polymer is contacted with the polar solvent while it is still wet or swollen by the non-polar polymerization solvent, as is the case in practicing this invention. Thus in accordance with this invention no complex purification of the polymer is required to free it of catalyst residues. This freedom from catalyst residues is evidenced by the fact that benzene solutions of polymers produced in accordance with the present invention are clear, whereas similar solutions of polymers containing minor amounts of catalyst residues are hazy. It should also be noted that while the polymer must be kept at a relatively low temperature below that at which it becomes tacky so long as no polar solvent is present in order to prevent it losing its granular form, in the presence of the polar solvent, it will retain its granular form so long as the temperature is not so high that the polymer becomes soluble therein or tends to flow and lose its shape.

The present invention will be fully understood from the following specific examples:

*Example 1*

Two hundred grams of monomeric n-butyl vinyl ether were dissolved in 600 grams of liquefied propane. The solution was chilled to about $-75°$ C. by the addition of 750 grams of granular solid carbon dioxide. Seven grams of diethylether-boron trifluoride complex was then added dropwise, the solution being constantly agitated. The polymerization reaction was completed in about an hour, at which time the carbon dioxide had all vaporized and the temperature was still approximately $-75°$ C. The high polymer of the n-butyl vinyl ether, formed by the polymerization, was present in the form of small granules or particles in the liquefied propane. To this slurry, at a temperature of $-75°$ C., there was then added 2000 grams of methanol, at $-40°$ C., containing 26 grams of diphenylamine. The mixture was agitated for ½ hour and slightly heated so that the propane was boiled off at about $-40°$ C. After evaporation of the propane, there remained a slurry of polymeric n-butyl vinyl ether in methanol. This was filtered and the separated high polymer dried in an oven at atmospheric pressure and at 50° C. for one day. The polymer thus obtained was granular and non-sticky. It was stored at room temperature for 6 months and remained granular and non-sticky after storage and the individual particles retained their individuality. These particles were readily soluble in suitable solvents, such as benzene, and gave clear solutions in solvents, thus indicating that the catalysts had been substantially completely removed from the polymer. The diphenylamine which was incorporated with the methanol functioned both to quench the catalyst and to stabilize the polymer.

*Example 2*

Two hundred grams of purified n-butyl ether were dissolved in 600 grams of propane and 750 grams of granular solid $CO_2$ was added. The mixture was agitated in a vessel surrounded by a Dry Ice methanol mixture, at $-80°$ C. Four grams of purified diethylether boron trifluoride, precooled to $-50°$ C., was added dropwise. As the catalyst was added, high polymer was formed as a separate phase and was suspended in the cold mixture in the form of small particles or granules. These granules were removed from the mixture, as formed, and transferred while still at $-80°$ C. to a bath of methanol chilled to about $-20°$ C. The chilled methanol contained from 2% to 3% concentrated aqueous ammonium hydroxide (28%) to quench the catalyst. The high polymer was separated from the ammoniacal methanol by filtration and was dried at 50° C. in an oven. The polymer was obtained in the form of small particles which were non-sticky and which readily entered into solution with suitable solvents.

*Example 3*

One part-by-weight of n-butyl vinyl ether was dissolved in 4 parts-by-weight of liquefied propane. The mixture was cooled in an open vessel to $-75°$ C. There was then added, dropwise and with agitation, 1/100 part-by-weight of purified diethylether boron trifluoride during 45 minutes. A barely stirrable slurry of polymer in propane was obtained. There was added quickly 100 grams or 2½ parts of methanol containing 10% concentrated aqueous ammonium hydroxide to quench the catalyst and 0.2% of a hydroxy phenyl morpholine derivative, Solux, as a stabilizer, the temperature being maintained at $-75°$ C. The mixture was allowed to come to room temperature while being agitated continuously, during which time the propane boiled away. After standing at room temperature for about one hour, the polymer was separated from the methanol by filtration and dried in an oven at 50° C. The thus obtained polymer was granular and non-sticky. It was readily dissolved in suitable solvents and gave clear solutions.

*Example 4*

Polymeric isobutylether was prepared by passing boron trifluoride gas into a solution of isobutyl vinyl ether and propane in the ratio of 3:1 at $-50°$ C. The polymer was recovered from the solution, as formed, in the form of small particles and was mixed with an ammoniacal ethanol containing 10% water at $+20°$ C. The polymer was separated from the ammoniacal ethanol by filtration and dried in an oven at 50° C. After drying, the polymer consisted of small non-sticky granules.

*Example 5*

Two hundred fifty grams of n-butyl vinyl ether was dissolved in 900 grams of propane. Fourteen hundred grams of fine solid $CO_2$ was added and the solution thus chilled to $-75°$ C. Diethylether-boron trifluoride catalyst was added dropwise until the polymerization was complete, approximately one hour. There was then added a mixture of 600 grams of acetone, 60 grams of water, and 10 grams of n-butyl monoethanolamine. During the addition of this mixture and subsequent agitation, the propane boiled away and the temperature rose to 0° C. The polymer was separated from the acetone by filtration and the filtered product, which was a granular high polymer, was dried in an oven at 50° C. to yield 191 grams of product.

*Example 6*

Two hundred fifty grams of isopropyl vinyl ether is dissolved in 900 grams of propane and polymerized at $-80°$ C. by dropwise addition of boron trifluoride liquid. The thus obtained slurry of polymer and propane was quickly mixed with ammoniacal monomethylether of ethylene glycol (methyl Cellosolve). The polymer was separated from the methyl Cellosolve by filtration and slowly warmed in an oven. Any propane remaining on the polymer had been evaporated by the time a temperature of 0° C. had been reached, approximately one hour. The polymer was then further dried at a temperature of 50° C. and was obtained in the form of a granular non-sticky product.

I claim:

1. In the process of producing tacky rubber-like polymers of propyl vinyl ethers, wherein a monomeric propyl vinyl ether dissolved in a liquefied normally gaseous hydrocarbon is polymerized by subjecting it to the action of an acid-reacting polymerization catalyst at a low temperature such that a suspension of granules of said tacky rubber-like polymer of said propyl vinyl ether in said liquefied normally gaseous hydrocarbon is obtained, the improvement for recovering said polymer in granular form, which comprises mixing with said suspension while it is still at a temperature below that at which said polymer is soluble in said liquefied normally gaseous hydrocarbon, methanol in an amount sufficient to wet said polymer, and removing said liquefied normally gaseous hydrocarbon from said suspension while said polymer is wet with said methanol and at a temperature below that at which said polymer loses its granular form, whereby said polymer is obtained in a non-sticky granular form.

2. In the process of producing tacky rubber-like polymers of butyl vinyl ethers, wherein a monomeric butyl vinyl ether dissolved in a liquefied normally gaseous hydrocarbon is polymerized by subjecting it to the action of an acid-reacting polymerization catalyst at a low temperature such that a suspension of granules of said tacky rubber-like polymer of said butyl vinyl ether in said liquefied normally gaseous hydrocarbon is obtained, the improvement for recovering said polymer in granular form, which comprises mixing with said suspension while it is still at a temperature below that at which said polymer is soluble in said liquefied normally gaseous hydrocarbon, methanol in an amount sufficient to wet said polymer, and removing said liquefied normally gaseous hydrocarbon from said suspension while said polymer is wet with said methanol and at a temperature below that at which said polymer loses its granular form, whereby said polymer is obtained in a non-sticky granular form.

3. In the process of producing tacky rubber-like polymers of vinyl ethers wherein a vinyl ether adapted to form such tacky rubber-like polymers dissolved in a liquefied normally gaseous hydrocarbon is polymerized by subjecting it to the action of an acid-reacting polymerization catalyst at a low temperature such that a suspension of granules of said tacky rubber-like polymer of said vinyl ether in said liquefied normally gaseous hydrocarbon is obtained, the improvement for recovering said polymer in a granular form which comprises wetting the thus-obtained polymer, while it is still wet with said liquefied normally gaseous hydrocarbon and at a temperature below that at which said polymer is soluble in said liquefied normally gaseous hydrocarbon, with a polar liquid selected from the group consisting of lower saturated aliphatic monohydric alcohols having from one to four carbon atoms, acetone, methyl-ethyl-ketone, monomethyl ether of ethylene glycol and monobutyl ether of ethylene glycol which swells but does not dissolve said polymer in an amount sufficient to wet said polymer, and removing said liquefied normally gaseous hydrocarbon from said polymer while it is still wet with said polar liquid and at a temperature below that at which said polymer loses its granular form, whereby said polymer is obtained in a granular form.

4. In the process of producing tacky rubber-like polymers of vinyl ethers wherein a vinyl ether adapted to form such tacky rubber-like polymers dissolved in propane is polymerized by subjecting it to the action of an acid-reacting polymerization catalyst at a low temperature such that a suspension of granules of said tacky rubber-like polymer of said vinyl ether in said propane is obtained, the improvement for recovering said polymer in a granular form which comprises wetting the thus-obtained polymer, while it is still wet with said propane and at a temperature below that at which said polymer is soluble in said propane, with a polar liquid selected from the group consisting of lower saturated aliphatic monohydric alcohols having from one to four carbon atoms, acetone, methyl-ethyl-ketone, monomethyl ether of ethylene glycol and monobutyl ether of ethylene glycol which swells but does not dissolve said polymer in an amount sufficient to wet said polymer, and removing said propane from said polymer while it is still wet with said polar liquid and at a temperature below that at which said polymer loses its granular form, whereby said polymer is obtained in a granular form.

5. In the process of producing tacky rubber-like polymers of vinyl ethers wherein a vinyl ether adapted to form such tacky rubber-like polymers dissolved in a liquefied normally gaseous hydrocarbon is polymerized by subjecting it to the action of an acid-reacting polymerization catalyst at a low temperature such that a suspension of granules of said tacky rubber-like polymer of said vinyl ether in said liquefied normally gaseous hydrocarbon is obtained, the improvement for recovering said polymer in a granular form which comprises wetting the thus-obtained polymer, while it is still wet with said liquefied normally gaseous hydrocarbon and at a temperature below that at which said polymer is soluble in said liquefied normally gaseous hydrocarbon, with methanol in an amount sufficient to wet said polymer and removing said liquefied normally gaseous hydrocarbon from said polymer while it is still wet with said methanol and at a temperature below that at which said polymer loses its granular form, whereby said polymer is obtained in a granular form.

6. In the process of producing tacky rubber-like polymers of vinyl ethers wherein a vinyl ether adapted to form such tacky rubber-like polymers dissolved in a liquefied normally gaseous hydrocarbon is polymerized by subjecting it to the action of an acid-reacting polymerization catalyst at a low temperature such that a suspension of granules of said tacky rubber-like polymer of said vinyl ether in said liquefied normally gaseous hydrocarbon is obtained, the improvement for recovering said polymer in a granular form which comprises wetting the thus-obtained polymer, while it is still wet with said liquefied normally gaseous hydrocarbon and at a temperature below that at which said polymer is soluble in said liquefied normally gaseous hydrocarbon with acetone in an amount sufficient to wet said polymer and removing said liquefied normally gaseous hydrocarbon from said polymer while it is still wet with said acetone and at a temperature below that at which said polymer loses its granular form, whereby said polymer is obtained in a granular form.

7. In the process of producing tacky rubber-like polymers of vinyl ethers wherein a vinyl ether adapted to form such tacky rubber-like polymers dissolved in a liquefied normally gaseous hydrocarbon is polymerized by subjecting it to the action of an acid-reacting polymerization catalyst at a low temperature such that a suspension of granules of said tacky rubber-like polymer of said vinyl ether in said liquefied normally gaseous hydrocarbon is obtained, the improvement for recovering said polymer in a granular form which comprises mixing with said suspension while it is at a temperature below that at which said polymer is soluble in said liquefied normally gaseous hydrocarbon, a polar liquid selected from the group consisting of lower saturated aliphatic monohydric alcohols having from one to four carbon atoms, acetone, methyl-ethyl-ketone, monomethyl ether of ethylene glycol and monobutyl ether of ethylene glycol which swells but does not dissolve said polymer in an amount sufficient to wet said polymer and removing said liquefied normally gaseous hydrocarbon from said slurry at a temperature below that at which said polymer loses its granular form, whereby said polymer is obtained in a non-sticky granular form.

8. In the process of producing tacky rubber-like polymers of vinyl ethers wherein a vinyl ether adapted to form such tacky rubber-like polymers dissolved in a liquefied normally gaseous hydrocarbon is polymerized by subjecting it to the action of an acid-reacting polymerization catalyst at a low temperature such that a suspension of granules of said tacky rubber-like polymer of said vinyl ether in said liquefied normally gaseous hydrocarbon is obtained, the improvement for recovering said polymer in a granular form which comprises separating the greater part of said liquefied normally gaseous hydrocarbon from the thus-obtained polymer at a temperature below that at which said polymer is soluble in said liquefied normally gaseous hydrocarbon and wetting said polymer, while it is still wet with said liquefied normally gaseous hydrocarbon and at such low temperature, with a polar liquid selected from the group consisting of lower saturated aliphatic monohydric alcohols having from one to four carbon atoms, acetone, methyl-ethyl-ketone, monomethyl ether of ethylene glycol and monobutyl ether of ethylene glycol which swells but does not dissolve said polymer in an amount sufficient to wet said polymer and removing the remainder of said liquefied normally gaseous hydrocarbon from said polymer while it is still wet with said polar liquid and at a temperature below that at which said polymer loses its granular form, whereby said polymer is obtained in a granular form.

9. In the process of producing tacky rubber-like polymers of vinyl ethers wherein a vinyl ether adapted to form such tacky rubber-like polymers dissolved in a liquefied normally gaseous hydrocarbon is polymerized by subjecting it to the action of an acid-reacting polymerization catalyst at a low temperature such that a suspension of granules of said tacky rubber-like polymer of said vinyl ether in said liquefied normally gaseous hydrocarbon is obtained, the improvement for recovering said polymer in a granular form which comprises wetting the thus-obtained polymer, while it is still wet with said liquefied normally gaseous hydrocarbon and at a temperature below that at which said polymer is soluble in said liquefied normally gaseous hydrocarbon, with a polar liquid selected from the group consisting of lower saturated aliphatic monohydric alcohols having from one to four carbon atoms, acetone, methyl-ethyl-ketone, monomethyl ether of ethylene glycol and monobutyl ether of ethylene glycol which swells but does not dissolve said polymer in an amount sufficient to wet said polymer, and removing said liquefied normally gaseous hydrocarbon from said polymer while it is still wet with said polar liquid and at a temperature below that at which said polymer loses its granular form, and thereafter removing said polar liquid from said polymer at a temperature below that at which said polymer loses its granular form to thereby dry said polymer, whereby said polymer is obtained in a granular form.

10. In the process of producing tacky rubber-like polymers of vinyl ethers wherein a vinyl ether adapted to form such tacky rubber-like polymers dissolved in a liquefied normally gaseous hydrocarbon is polymerized by subjecting it to the action of an acid reacting polymerization catalyst at a low temperature such that a suspension of granules of said tacky rubber-like polymer of said vinyl ether in said liquefied normally gaseous hydrocarbon is obtained, the improvement for recovering said polymer in a granular form which comprises adding to said suspension while it is at a temperature below that at which said polymer is soluble in said liquefied normally gaseous hydrocarbon, a polar liquid selected from the group consisting of lower saturated aliphatic monohydric alcohols having from one to four carbon atoms, acetone, methyl-ethyl-ketone, monomethyl ether of ethylene glycol and monobutyl ether of ethylene glycol which swells but does not dissolve said polymer in an amount sufficient to wet said polymer, vaporizing said liquefied normally gaseous hydrocarbon at a temperature below that at which said polymer loses its granular form, whereby said polymer is obtained wet with said polar liquid and in a granular form.

CALVIN E. SCHILDKNECHT.

REFERENCES CITED

The following references are of record in the file of this patent:

UNITED STATES PATENTS

| Number | Name | Date |
| --- | --- | --- |
| 1,427,690 | Leyseiffer | Aug. 29, 1922 |
| 1,845,821 | Theumann | Feb. 16, 1932 |
| 1,924,464 | Skilling | Aug. 29, 1933 |
| 2,047,968 | Jacobsen | July 21, 1936 |
| 2,061,934 | Cunradi | Nov. 24, 1936 |
| 2,099,090 | Webb | Nov. 16, 1937 |
| 2,356,896 | Smith | Aug. 29, 1944 |
| 2,389,940 | Speicher | Nov. 27, 1945 |

FOREIGN PATENTS

| Number | Country | Date |
| --- | --- | --- |
| 670,212 | Germany | Jan. 13, 1939 |